Sept. 4, 1928.

F. T. HOULE

VEHICLE BODY

Filed April 4, 1922

1,683,467

INVENTOR:
Francis T. Houle
by Macleod, Calver, Copeland & Dike
Attys.

Patented Sept. 4, 1928.

1,683,467

UNITED STATES PATENT OFFICE.

FRANCIS T. HOULE, OF AMESBURY, MASSACHUSETTS, ASSIGNOR TO BIDDLE & SMART COMPANY, OF AMESBURY, MASSACHUSETTS, A CORPORATION OF MASSACHUSETTS.

VEHICLE BODY.

Application filed April 4, 1922. Serial No. 549,439.

This invention relates to vehicles bodies, and particularly to automobile bodies, of the type comprising a frame having a covering of sheet material, usually sheet metal, such as aluminum.

In such bodies as usually constructed, the covering comprises upper and lower sections which meet at an approximately horizontal line extending about the body. In order to form a tight and neat appearing joint along this line, various expedients have been adopted, such as the use of a separate molding strip to cover the joint, the employment of separate attaching strips for one or the other of the sections, or the relative offsetting of the sections to form an overhanging shoulder along the line in question.

The present invention has for its object to provide a joint of the character referred to which is of simple and inexpensive construction, which is of neat and attractive appearance, which permits the two sections to lie flush with one another, which effectually excludes water, which does not require any supplemental strips or other elements in addition to the covering sections themselves and the nails or other fastening devices for securing the same to the frame, and in which said fastening devices are entirely concealed.

The foregoing and other objects of the invention, together with means whereby the same may be carried into effect, will best be understood from the following description of one form or embodiment thereof illustrated in the accompanying drawings, in which.

Figure 1:
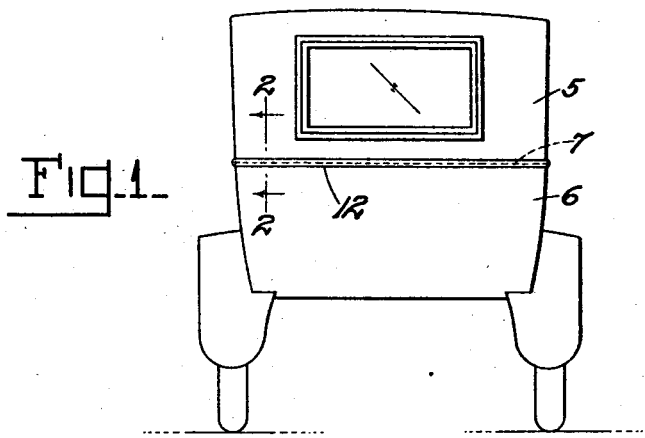
Fig. 1 is a rear elevation of an automobile having a body constructed in accordance with the invention.
Figure 2:
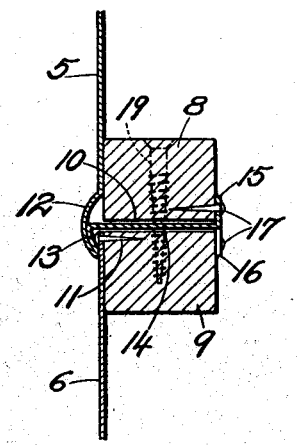
Fig. 2 is an enlarged detail sectional view taken substantially on the line 2—2, Figure 1.
Figure 3:
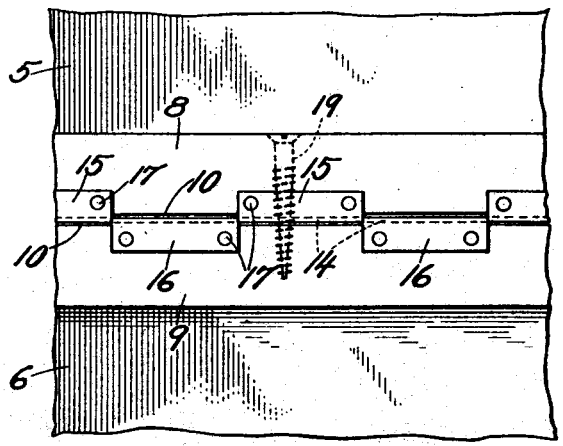
Fig. 3 is a detail elevation of the joint as viewed from the interior of the body, or from the right of Figure 2.

The automobile body shown in Figure 1 is provided with a covering of sheet metal or other sheet material comprising an upper section 5 and a lower section 6 lying substantially flush therewith, the joint between the two sections being indicated at 7. The covering sections 5 and 6 are secured to the usual inner frame of wood or other material, said frame, in accordance with the present invention, comprising upper and lower parallel portions 8 and 9 (see Figures 2 and 3) having between them a slot or slots 10, disposed adjacent the joint 7. The frame portions 8 and 9 at the back and each side of the body may comprise two separate parallel members spaced apart to provide the slot 10, or may assume the form of a single frame member having a longitudinal slot therein. The upper edge of the lower section 6 lies substantially at the lower edge of the slot 10, and the upper margin of said section adjacent said edge is secured to the outer face of the frame portion 9 by nails or other suitable fastening devices 11. The lower marginal portion of the upper section 5 adjacent the slot 10 is offset outwardly or bent into the form of a molding 12 overlapping the upper margin of the lower section 6, is thence doubled upon itself, as shown at 13, to a line substantially opposite the upper edge of the lower section 6, and is thence bent inwardly, as indicated at 14 in Fig. 2, and extended into the frame through the slot 10, where it is secured to said frame within the latter. Preferably the inner edge of the said marginal portion is slitted to form tongues 15 and 16 which are bent alternately upwardly and downwardly and secured to the inner faces of the frame portions 8 and 9, respectively, by means of nails or other fasteners 17. At 19 is indicated one of a series of screws or other fastening means by which the frame members 8 and 9 are drawn together and secured to each other to make a more firm and rigid joint.

It will be seen that the covering above described presents a neat appearance, requires no offsetting of the covering sections and is of a simple and inexpensive character capable of being very easily applied and requiring no molding or fastening strips or other auxiliary parts. It will also be seen that there is no crack or other opening at the upper side of the joint through which water may enter, the molding 12 being integral with the upper covering section 5 and overlapping the upper edge and margin of the lower section 6. Moreover, by extending the part 14 through the frame to the interior thereof, it will be seen that said part may be engaged by a suitable gripping tool, whereby the joint may be drawn as tightly as may be desired, prior to the bending of the tongues 15 and 16 and the insertion of the fastenings 17, thereby causing the lower edge of the molding 12 to engage the outer surface of the lower section 6 with any desired degree of pressure. Furthermore, although both of the covering sections are secured directly to the frame without interposition of other fastening members, it will be seen that the nails or other fasteners 11 and 17 by which said sections are secured to the frame are all concealed, so as to be invisible from the exterior. These and other advantages of the invention will, however, be readily understood without further explanation.

What I claim is:

1. A vehicle body comprising a frame having two parallel portions forming between them a slot, and a covering of sheet material, said covering having a marginal portion bent at an angle to the remainder thereof and extended through said slot, the inner edge of said marginal portion being slitted to form tongues which are bent alternately in opposite directions and secured to the inner sides of said frame portions respectively.

2. A vehicle body comprising a frame and a covering therefor of sheet material comprising a pair of adjacent sections, one section having a marginal portion bent to form a bead covering the joint between the sections said bead having an integral projection extending inwardly through the frame and bent in opposite directions over the inner face of the frame.

In testimony whereof I affix my signature.

FRANCIS T. HOULE.